United States Patent [19]

Baumann et al.

[11] Patent Number: 4,936,870
[45] Date of Patent: Jun. 26, 1990

[54] PROCESS FOR DETERMINATION AND CONTROL OF FUEL MASS FLOW IN PARTIAL OXIDATION AND GASIFICATION OF A FINE-GRAINED TO POWDERY FUEL

[75] Inventors: Hans R. Baumann; Adolf Linke; Eberhard Kuske, all of Essen; Hans-Reiner Schweimanns, Hattingen, all of Fed. Rep. of Germany

[73] Assignee: Krupp Koppers GmbH, Essen, Fed. Rep. of Germany

[21] Appl. No.: 379,808

[22] Filed: Jul. 13, 1989

[30] Foreign Application Priority Data

Jul. 14, 1988 [DE] Fed. Rep. of Germany ....... 3823773

[51] Int. Cl.$^5$ .............................................. C10J 3/46
[52] U.S. Cl. .................................... 48/197 R; 48/206; 48/DIG. 4; 48/DIG. 10; 73/861.04; 406/197
[58] Field of Search ...................... 48/197 R, 203, 206, 48/210, DIG. 4, DIG. 10, 86 R; 406/197, 14, 19, 29, 33; 250/356.1; 73/861.02, 861.04; 431/6, 12

[56] References Cited

U.S. PATENT DOCUMENTS

| | | | |
|---|---|---|---|
| 3,159,432 | 12/1964 | Ostrowski et al. | 406/14 |
| 4,017,269 | 4/1977 | Dutz et al. | 48/197 R |
| 4,073,628 | 2/1978 | Geinhardt et al. | 48/DIG. 4 |
| 4,182,957 | 1/1980 | Forster et al. | 250/356.1 |
| 4,270,558 | 6/1981 | Forster et al. | 48/DIG. 4 |
| 4,325,709 | 4/1982 | Gobler et al. | 48/DIG. 4 |
| 4,489,562 | 12/1984 | Snyder | 48/86 R |
| 4,521,139 | 6/1985 | Kretschner et al. | 406/19 |
| 4,791,817 | 12/1988 | Albert et al. | 73/861.04 |
| 4,830,545 | 5/1989 | Salter et al. | 48/DIG. 4 |
| 4,844,663 | 7/1989 | Salter et al. | 406/197 |

Primary Examiner—Peter Kratz
Attorney, Agent, or Firm—Michael J. Striker

[57] ABSTRACT

The process for determining and controlling the fuel mass flow in partial oxidation and gasification of a fine-grained to powdery fuel includes particularly drawing the fuel from the supply vessel through a single outlet pipe and feeding the fuel to a distributor, in which a plurality of individual supply lines are connected to the individual burners, the fuel mass flow rate in the supply lines depending on the speed measured there and the radiometric density measurement being determined in the outlet pipe of the supply vessel. For control of the fuel mass flow a stepwise regulation depending on the crude gas flow produced in the gasification unit is thus provided.

9 Claims, 1 Drawing Sheet

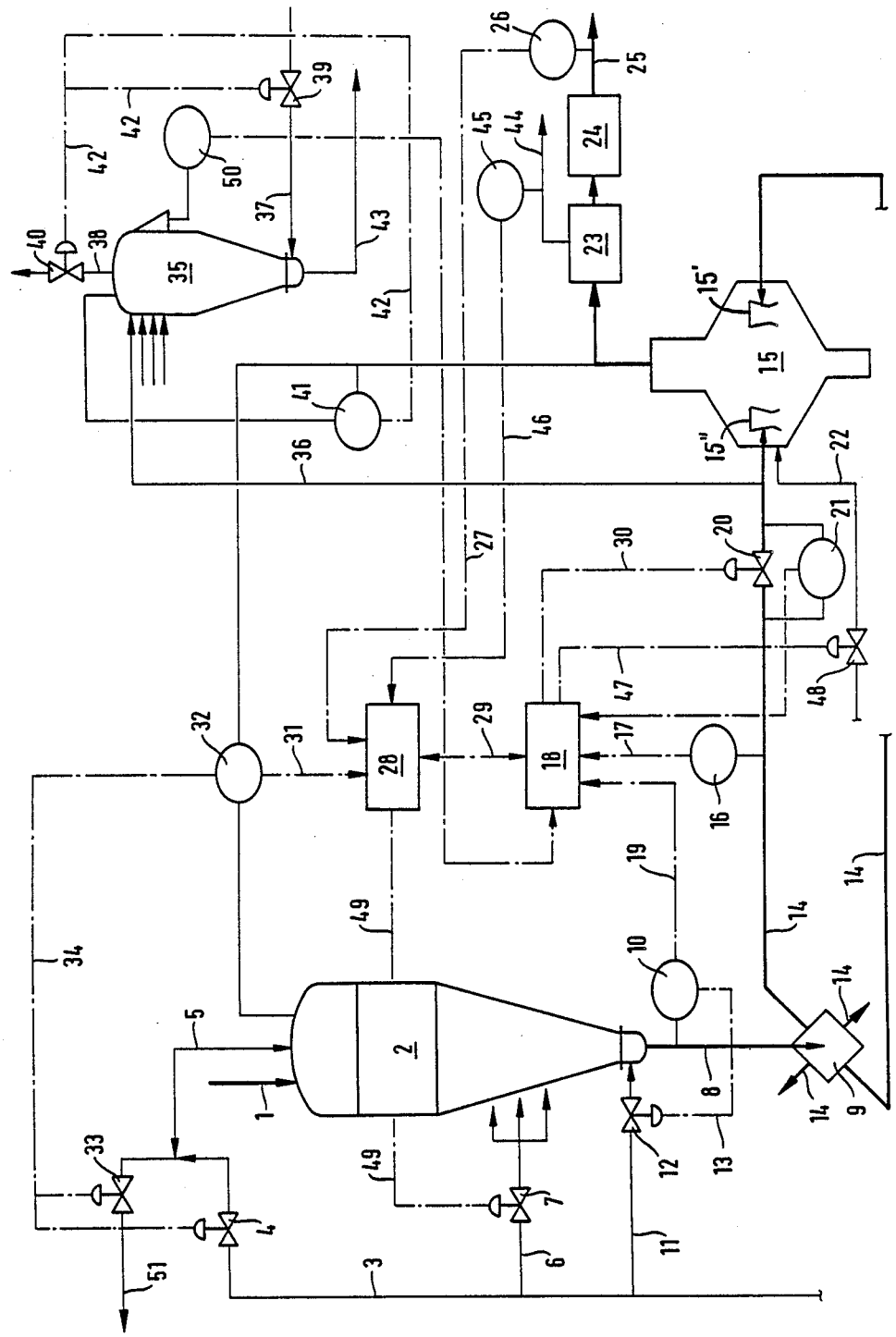

PROCESS FOR DETERMINATION AND CONTROL OF FUEL MASS FLOW IN PARTIAL OXIDATION AND GASIFICATION OF A FINE-GRAINED TO POWDERY FUEL

BACKGROUND OF THE INVENTION

Our invention relates to a process for determining and controlling fuel mass flow in the partial oxidation and gasification of fine-grained to powdery fuel.

Our process determines and controls fuel mass flow, which is supplied to a gasifying unit with at least two burners in the partial oxidation and gasification of a fine-grained to powdery fuel, using a radiometric density measurement of the fuel transported from a central supply vessel to the individual burners by a gaseous medium and using a process computer for performing the required computational operations.

In gasification of solid combustible materials, such as brown coal or soft coal and/or oil coke, the fine-grained to powdery combustible material, which if necessary can be brought to the desired grain size by a grinding process, must be fed to the gasification unit with the gaseous and/or vaporous reaction medium in a uniform and quantitative accurate flow. This is required, so that constant operating conditions can be set in the gasification unit, by which a uniform quality and quantity of partially oxidized gases produced is guaranteed. Oxygen and air and/or air enriched with oxygen and if necessary added water vapor can be used as the gaseous and/or vaporous reaction medium. If the fuel components in the reaction mixture are too small in the gasification unit, an undesirable increase of the operating temperature in the gasification unit is caused because of the high oxygen:fuel ratio. If in contrast the reverse is true and the fuel components in the reaction mixture in the gasification unit are too high, this causes an incomplete reaction of the fuel with the oxidizing agent. It is thus possible that unconverted fuel particles are deposited in the gasification unit or are carried out together with the gas produced from the gasification unit. Furthermore under these circumstances the reaction can then halt or be interrupted. Variations of the fuel mass flow fed to the gasification unit lead necessarily to variations in the flow of partially oxidized gases produced, which naturally can also impair the subsequent consumption of the gas. That is particularly the case, when the partial oxidized gas is produced for combustion in a gas turbine in a gas and steam turbine power plant connected to the gasification unit. Here in the interest of a uniform and trouble-free operation of the power plant it must be unconditionally guaranteed that the combustion gas flow required for gas turbine operation must be available in a sufficient extent and also on shutting down or reducing the operation of the gas turbine the combustion gas feed and thus the gasification output can be choked or reduced as quickly as possible and without difficulty.

Because of the above-named reasons it is necessary to determine and control as accurately as possible the the fuel mass flow, which is fed to the individual burners of the gasification unit. Because of that the modern gasification units today are equipped continuously with at least two burners distributed uniformly about the periphery of the reactor, which must be simultaneously provided with fuel.

In the German Published Patent Application No. 33 16 368 a process for determination and observation of the fuel mass flow supplied to the gasification unit was set forth in which each burner of the gasification unit is connected by a separate pipe with the central supply vessel for the fuel feed. In each of these pipes the fuel flow conveyed with the fluidizing gas is subjected to a radiometric density measurement and subsequent to that a pressure difference measurement. From the value obtained together with the value for the fluidizing gas fed to the supply vessel and the fluidizing gas conducted away from it the fuel mass flow is determined in a process computer.

Previously described processes limit themselves to the determination and observation of the fuel mass flow, which is fed to the individual burners of the gasification unit. In contrast nothing is expressed about control of this mass flow in these previous processes. Furthermore the processes previously described are also expensive in regard to apparatus, since in each of the pipes leading to the individual burners of the gasification unit a radiometric density measurement must be performed.

SUMMARY OF THE INVENTION

Accordingly, it is an object of our invention to provide a process for determining and controlling the fuel mass flow in partial oxidation and gasification to simplify the known process in regard to the apparatus.

In keeping with this object and with others which will become apparent hereinafter, our process comprises the following steps:

a. drawing the fuel from the supply vessel through a single outlet pipe and feeding the fuel to a distributor, in which a plurality of individual supply lines are connected to the individual burners, the radiometric density measurement being performed only in the outlet pipe of the supply vessel connected to the distributor;

b. determining the fuel mass flow in the supply lines to the individual burners depending on a speed measured there and a density measured in the outlet pipe, no additional conveying gas being mixed with the fuel in the supply lines and a plurality of individual mass flows determined in the supply lines being added in the process computer to obtain a total mass flow of fuel fed from the supply vessel to the gasification unit; and c. using a crude gas flow produced in the gasification unit as a guiding variable for stepwise regulation of the total mass flow.

In contrast to the known process in the process according to our invention the fuel drawn from the supply vessel flows through only a single outlet pipe, in which the radiometric density measurement is made. This pipe opens into a distributor, in which the supply lines are connected to the individual burners of the gasification unit. In these supply line the speed of the fuel fluidized in a carrier gas is measured and from the value obtained incorporating the value for the density, which is measured in the outlet pipe from the supply vessel by radiometric density measurement, the fuel mass flow for the feed pipe is determined according to the following relationship:

$$M = S_R \times W \times F \times c,$$

in which $S_R$, W, F and c have the following meaning:
$S_R$ = flow density in the outlet pipe,
W = speed in the individual supply lines,
F = cross section at a measuring point in the speed measuring device in the individual supply lines, and c=correction factor for consideration of material properties and comparison of the measurement accuracy.

The units of $S_R$ are $kg/m^3$, W are m/s and F in $m^2$. The fuel mass flows determined in the individual supply lines are then added in the process computer to obtain a total mass flow.

Since the size of the fuel mass flow fed to the burners of the gasification unit understandably influences the crude gas flow produced by the gasification unit and this crude gas flow can be used as a guiding variable for the total mass flow. Thus our process can also comprise the step of changing a set value of a control valve located in the supply lines to make the required change of total mass flow when the absolute rate of the crude gas flow changes by less than 10%. Also our process can advantageously include the process of changing the set value of the control valve located in the supply line and simultaneously changing stepwise a pressure difference between the supply vessel and the gasification unit when the absolute rate of the crude gas flow is more than 10% and less than or equal to 50% of a standard output flow rate. The process can additionally comprise the step of interrupting the fuel feed to an individual burner and shutting off the individual burner when the crude gas flow rate is greater than 50%.

Other embodiments of our process are also possible. Our process for determination and control of the fuel mass flow rate also comprises the step of setting a uniform flow density for the fuel in the outlet pipe from the supply vessel, which corresponds to 40 to 90% of a bulk density of the fuel being used Also advantageously a pressure difference meter can be provided in the supply lines to the burners, by which the control valve is adjustable, so that a clogging of the supply lines and an increased wear of the control valve is avoided. A burning gas mixture can be conducted from the supply lines to the burners in a buffer vessel on start-up and shutting off of the burners.

A steam flow rate for steam produced in a heating vessel of the gasification unit can be used as a correction variable for a oxygen/fuel ratio in the gasification.

BRIEF DESCRIPTION OF THE DRAWING

The objects, features and advantages of our invention will be made more apparent from the following detailed description, reference being made to the accompanying drawing in which:

The sole figure is a flow chart showing a plant which performs the process according to our invention.

DETAILED DESCRIPTION OF THE INVENTION

The fuel delivered for gasification is conducted over the feed pipe 1 to the supply vessel 2. The fuel feed occurs in a known manner for example cyclically from a gated container or continuously by pressurized drop feeder, which are not shown in detail in the drawing. In the supply vessel 2 fluidized fuel is under pressure, which is somewhat higher than the operating pressure of the gasification unit 15. Thus the required gas flow is fed to the supply vessel 2 by the pipe 3 and the pressure regulator valve 4 and delivered over the pipe 5 from above in pouring the fuel. As a gas especially $N_2$, $CO_2$ or a burnable gas, for example a partial flow of the partially oxidized gases produced, can be used. The pipe 6 branches from the pipe 3. A partial flow of gases is conducted through the pipe 6 into the supply vessel 2 in the vicinity of the funnel-like tapered outlet in several planes. Bridge formation of the fuel at the outlet of the supply vessel 2 is avoided because of that. The pressure regulator valve 7 regulates the gas partial flow. The size of the gas partial flow in pipe 6 depends on the output of the gasification unit 15. With a minimal output of the same this gas partial flow corresponds to about 100% of that needed for pneumatic supply of the fuel. The pressure regulator valve 4 is then closed and a small excess of gas flows out through the gas regulator valve 33. At higher output from the gasification unit 15 the gas flow in the pipe 6 covers about a third of the needs required for pneumatic supply of the fuel and for maintaining the pressure in the supply vessel 2. The pressure regulating valve 33 is then closed. The adjustment of the gas partial flow in the pipe 6 by the pressure regulating valve 7 occurs depending on the raw gas quantity determined in the measuring unit 26, whereby the ratio regulation occurs by the process computer 28. The process computer is connected thus by the stepping line 49 with the pressure regulator valve 7. The gas feed to the supply vessel 2 is adjusted so that at the funnel-like tapered outlet of the supply vessel 2 a uniform flow density of the fuel-gas mixture of 80 to 90% of the bulk density of the fuel is set. The fuel-gas mixture issuing from the supply vessel arrives in the distributor 9 through the outlet pipe 8. The radiometric density meter 10 is installed in the outlet pipe 8. The value measured there can be used for control of the pressurized control valve 12 in the pipe 11 by the stepping line 13, by which an additional partial flow of gases from the pipe 3 can be guided into the lower portion of the outlet of the supply vessel 2. Because of that the density of the fuel-gas mixture can change continuously in the vicinity of the approximately 40 to 90% of the bulk density of the fuel used and simultaneously the uniformity of the density is improved. Always a minimum gas partial flow in the lowest portion of the outlet of the supply vessel 2 must flow out over the pipe 11, which suffices for avoidance of the bridge build-up in this vicinity.

The supply lines 14 extend from the distributor 9 to the individual burners 15',15" of the gasifying unit 15. The fuel is divided by the distributor 9 into at least two, at higher gasification performance up to eight, supply lines 14, whereby the feed of additional gas in the supply lines 14 is avoided. In the flow chart shown in the drawing all together four supply lines 14 are provided. In the measuring unit 16 the speed of the fuel-gas mixture flowing through the supply lines 14 is determined and the value maintained at that provided by the process computer 18 over the stepping line 17. In this computer the value of the radiometric density measurement is fed by the stepping line 19 so that the fuel mass flow rate in the supply lines 14 can be determined according to the relationship given above in the process computer 18. In the flow chart illustrated in the drawing the measuring unit 16 with the stepping line 17 is indicated only in one supply line 14. Understandably the additional supply lines 14 are equipped in a suitable way so that the fuel mass flow rate can be similarly determined as described above in them. The values obtained are added in the process computer 18 to obtain the total mass flow rate.

A control valve 20 is installed in one of the supply lines 14 behind the measuring unit 16, by which the fuel mass flow rate can be adjusted in the supply line 14 and can be maintained constant at a predetermined set value.

The control valve 20 is associated with a pressure difference meter 21, by which the pressure difference at the control valve 20 can be observed. This can not exceed a certain maximum value, so that on the one hand a higher wear at the control valve 20 and on the other hand a clogging of the supply line 14 can be avoided.

In the gasification unit 15 the fuel is converted in a known manner with oxygen or an oxygen-steam mixture by partial oxidation to a partially oxidized crude gas, which after appropriate cooling and gas handling can be used either as a synthetic or as a combustible gas. The gasification unit 15 can be constructed according to a standard design, in which for example the gasification occurs in a smoke or dust cloud at a temperature above the slag melting point. The required reaction media(oxygen, steam) are fed to the individual burners 15', 15" of the gasification unit 15 over the pipe 22. The partially oxidized crude gas produced there arrives in the gas purifier 24 through the waste-heat boiler 23 and is subsequently fed for other uses or further processing through the pipe 25, e.g. as a combustible gas for the gas turbine of a gas and steam turbine power plant or after a suitable further processing as a synthetic gas. As was already explained above, the crude gas quantity determined by the measuring unit 26 serves as a guiding variable for the the stepwise control of the total mass flow rate of the fuel fed to the gasification unit. The value determined in the measuring unit 26 is supplied by the stepping line 27 to the processing computer 28, which is connected in a single unit with the processing computer 18 and/or is connected by the data transmission line 29 with it. The typical data for the fuel used and all other relevant data for performing the process are suppled to the process computer 28.

With changes of the crude gas flow rate determined by the measuring unit 26 within the range of ±10% the control valve 20 is operated by the stepping line 30 in the supply line 14 in a sense so that on a drop of the crude gas flow rate the valve is opened strongly and on increasing is throttled or closed strongly, whereby the total mass flow rate for the combustion gas feed to the gasification unit 15 can be controlled within certain limits.

On changing the crude gas flow rate determined to be in a size range of more than ±10% and ≦50% of a standard output level the previously described regulation of the fuel supply by the control valve 20 no longer suffices. In this case the required change of total mass flow rate must be caused by a stepwise change of the pressure difference between the supply vessel 2 and the gasification unit 15. As is known the pressure in the supply vessel 2 is somewhat higher than the pressure in the gasification unit 15 so that because of this pressure difference the fuel can be transported over the supply lines 14 without additional feed of carrier gas into the gasifying unit 15. The pressure difference between the supply vessel 2 and the gasification unit 15 is thus dependent on the mass flow rate of the fuel and the carrier flow density. The value determined in the measuring unit 26 is converted in process computer 28 into a control command for the pressure difference meter 32 and is transmitted to it by the stepping line 31. The pressure difference meter 32 measures the pressure difference between the supply vessel 2 and the gasification unit 15 and controls the pressure regulating valve 4 and 33 by the stepping line 34. Should the pressure difference increase and thus the total mass flow rate for the fuel feed to the gasifying unit 15 be increased greatly, the pressure regulator valve 4 in the pipe 3 is opened wide and the gas regulating valve 3 remains closed. Because of that the gas feed to the supply vessel 2 is increased and the pressure difference correspondingly increases. Alternatively the pressure difference can be lowered, when on opening the pressure regulator valve 33 excess gas can flow from the supply vessel 2 over the pipe 34. On stepwise changing or varying the pressure difference, e.g. on a reduction of about 0.5 bar, the control valves 20 are next tested, which maintain the previously set set value by additional opening. Because of that the pressure difference should approach zero at control valve 20. Thus after adjustment of the desired pressure difference between the supply vessel 2 and the gasifying unit 15 by the process computer 18 an adjustment of the set value for the control valve 20 can be made. The size of this set value adjustment depends on the number of burners 15', 15" in operation and the chosen pressure difference variation between the supply vessel 2 and the gasification unit 15. After making this set value adjustment the control valve 20 closes again and it sets a pressure difference again, which does not exceed the maximum allowed value.

On a rapid downward jump of the crude gas quantity in the size range of greater than 50% of a standard output level the required change of the total mass flow rate occurs subsequently by interruption of the fuel feed to the individual burners 15' or 15" and shutting off the flow to this burner 15' or 15". For the reverse situation naturally an additional burner must be put into operation, when the crude gas flow rate must be increased in an amount greater than 50% of a standard value.

So that by shutting off and/or cutting out individual burners the provided process course for the entire plant is not impaired and especially the fuel mass flow rate and the carrier flow density in the outlet pipe 8 from the supply vessel 2 can be kept constant without change, a buffer vessel 35 according to our invention can be provided. By feeding the fuel from one or more supply lines 14 into the buffer vessel 35 over the pipe 36 the desired stabilization of the fuel mass flow rate and the conveyor flow density can be attained. The buffer vessel 35 is equipped with the pipe 37 for the gas delivery and the pipe 38 for the gas exhaust, in which the pressure regulator valves 39 and 40 are installed. With the help of the pressure difference meter 41, which connects by the stepping line 42 with the pressure regulator valves 39 and 40, a constant pressure difference can be set in the buffer vessel 35 relative to the gasification unit 15. The buffer vessel 35 thus allows on start-up of the plant and with considerable output changes of the plant in the size range of greater than 50% an adjustment of the required burner supply pressure and the pressure-surge switching of the individual burners 15', 15". Excessive fuel can be drawn off from the buffer vessel 35 by the pipe 43.

The buffer vessel 35 can also be referred to for determination of the correction factor c in relation to determination of the fuel mass flow rate. This correction factor c can be determined from two subfactors according to the relation:

$$c = c_1 \times c_2.$$

The subfactor $c_1$ is equal for all supply lines 14 and is determined in a certain time interval, e.g. once daily, by a comparison of the total fuel feed to the supply vessel 2 with the total mass flow rate calculated in the process computer 18 for the fuel feed to the gasification unit 15 over the supply line 14. By the subfactor $c_1$ above all the specific influences of the fuel quality on the mass flow rate measurement are compensated or corrected.

In contrast the subfactor $c_2$ must not be equal for all supply lines 14. By it the inaccuracies of the measuring devices or meters for the density and speed measurement are corrected. For measurement of the subfactor $c_2$ in the supply line 14 the fuel flowing in this line is conducted by the pipe 36 into the buffer container 35. The subfactor $c_2$ is determined then so that the value determined in the supply line 14 for the fuel mass flow rate is compared with the value of the receiving weighing device 50 associated with the buffer vessel 35.

The steam produced in the heating vessel 23, which can be connected with the gasification unit 15 in a single structural unit, is drawn off by the pipe 44. The steam quantity produced can be determined by the steam flow measuring unit 45 and the determined value can be transmitted by the stepping line 46 to the process computer 28 and in this can be evaluated as a correction factor for the oxygen-fuel ratio or conditions in the gasification. Should the determined value deviate from that set, the control valve 48 in the pipe 22 is operated by the stepping line 47 and a suitable correction of the oxygen feed is performed.

In the drawing the pipes 22 and 36 are shown only once. Understandably in practice these pipes are provided for each burner 15' or 15" just like the supply lines 14. In the above-mentioned embodiment it is a rule that everything which has been said in regard to the supply lines 14 and the pipes 22 and 36, is also true for each of those conduits or pipes whose number corresponds to the number of the burner used.

It is to be understood that each of the elements described above, or two or more together, may also find a useful application in other types of constructions differing from the types described above.

While the invention has been illustrated and described as embodied in a process for determining and controlling fuel mass flow rate in the partial oxidation and gasification of fine-grained to powdery fuel, it is not intended to be limited to the details shown, since various modifications and structural changes may be made without departing in any way from the spirit of our present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

What is claimed is:

1. A process for determination and control of fuel mass flow, which is fed to a gasification unit with at least two burners in partial oxidation and gasification of a fine-grained to powdery fuel, using a radiometric fuel density measurement of said fuel conveyed from a central supply vessel to said burners of said gasification unit by a gaseous medium and a process computer for performing required computation operations, comprising the following steps:
   a. drawing said fuel from said supply vessel through a single outlet pipe and feeding said fuel to a distributor, in which a plurality of individual supply lines are connected to said burners individually, said radiometric density measurement being performed only in said outlet pipe of said supply vessel connected to said distributor;
   b. Determining a rate of said fuel mass flow in said supply lines to said individual burners depending on a speed measured there and a density measured in said outlet pipe, no additional conveying gas being mixed with said fuel in said supply lines and a plurality of individual mass flows determined in said supply lines being added in said process computer to obtain a total mass flow of said fuel fed from said supply vessel to said gasification unit; and
   c. using a crude gas flow produced in said gasification unit as a guiding variable for stepwise regulation of said total mass flow.

2. The process according to claim 1 wherein said rate of said fuel mass flow, M, in said supply lines to said burners is determined according to the following relationship:

$$M = S_R \times W \times F \times c,$$

wherein
$S_R$ = flow density in said outlet pipe,
$W$ = speed in said supply lines individually,
$F$ = cross section at a measuring point in a speed measuring device in one of said supply lines, and
$c$ = correction factor for consideration of material properties and comparison of measurement accuracy.

3. The process according to claim 1 in which said stepwise regulation is performed by a control valve in said supply lines by changing a set value of said control valve to make a required change of said total mass flow, when the absolute rate of said crude gas flow changes by less than 10%.

4. The process according to claim 1 in which said stepwise regulation is performed by a control valve in said supply lines by changing a set value of said control valve and simultaneously changing stepwise a pressure difference between said supply vessel and said gasification unit, when the absolute rate of said crude gas flow is more than 10% and less than or equal to 50% of a standard output flow rate.

5. The process according to claim 1 in which said stepwise regulation is performed by a control valve in said supply lines by interrupting said fuel fed to one of said burners and shutting off said burner, when said rate of said crude gas flow is greater than 50%.

6. The process according to claim 1 further comprising the step of setting a uniform flow density of said fuel in said outlet pipe from said supply vessel, which corresponds to 40 to 90% of a bulk density of said fuel being used.

7. The process according to claim 1 further comprising the step of adjusting a control valve provided in one of said supply lines using a pressure difference meter provided in said supply lines to said burners, so that a clogging of said supply lines and an increased wear of said control valve is avoided.

8. The process according to claim 1 further comprising the step of conducting a fuel-gas mixture from said supply lines to said burners in a buffer vessel on start-up and shut-off of said burners.

9. The process according to claim 1 further comprising the step of using a steam flow rate for steam produced in a heating vessel of said gasification unit as a correction variable for an oxygen/fuel ratio in said gasification.

* * * * *